United States Patent
Kim et al.

(10) Patent No.: US 9,584,273 B2
(45) Date of Patent: Feb. 28, 2017

(54) METHOD FOR SUPPORTING COMP IN WIRELESS COMMUNICATION SYSTEM AND DEVICE THEREFOR

(71) Applicant: LG ELECTRONICS INC., Seoul (KR)

(72) Inventors: Eunsun Kim, Anyang-si (KR); Jonghyun Park, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 14/430,488

(22) PCT Filed: Jul. 25, 2013

(86) PCT No.: PCT/KR2013/006675
§ 371 (c)(1),
(2) Date: Mar. 23, 2015

(87) PCT Pub. No.: WO2014/051249
PCT Pub. Date: Apr. 3, 2014

(65) Prior Publication Data
US 2015/0256306 A1 Sep. 10, 2015

Related U.S. Application Data

(60) Provisional application No. 61/706,787, filed on Sep. 28, 2012.

(51) Int. Cl.
*H04L 5/00* (2006.01)
*H04B 7/02* (2006.01)
(Continued)

(52) U.S. Cl.
CPC ............ *H04L 5/0035* (2013.01); *H04B 7/024* (2013.01); *H04W 72/042* (2013.01); *H04W 72/085* (2013.01); *H04W 72/1236* (2013.01)

(58) Field of Classification Search
None
See application file for complete search history.

(56) References Cited

U.S. PATENT DOCUMENTS 9,219,530 B2 * 12/2015 Koo ................ H04B 7/024
2011/0028171 A1   2/2011 Guo et al.
(Continued)

FOREIGN PATENT DOCUMENTS

KR   10-2012-0055609 A   5/2012
KR   10-2012-0061881 A   6/2012
(Continued)

OTHER PUBLICATIONS

Nortel, "Cell Clustering for CoMP Transmission/Reception", 3GPP TSG-RAN Working Group 1 Meeting #56, Athens, Greece, Feb. 9-13, 2009, pp. 1-4, R1-090745.

*Primary Examiner* — Min Jung
(74) *Attorney, Agent, or Firm* — Birch, Stewart, Kolasch & Birch, LLP

(57) ABSTRACT

One embodiment of the present invention discloses a method by which a CoMP scheduling device determines a CoMP set in a wireless communication system that supports coordinated multiple-point transmission and reception (CoMP), the method comprising the steps of receiving, from at least one base station, information on a terminal served by the base station; determining a CoMP set on the basis of the received information on the terminal (s); and transmitting identification information of the terminal(s) included in the CoMP set to a base station(s) included in the CoMP set, wherein the information on the terminal can include the identification information of the terminal, capability, quality of service (QoS), a channel state value between the terminal and each base station around the terminal, and/or ePDCCH set configuration information of the terminal.

14 Claims, 9 Drawing Sheets

(51) Int. Cl.
*H04W 72/12* (2009.01)
*H04W 72/04* (2009.01)
*H04W 72/08* (2009.01)

(56) References Cited

U.S. PATENT DOCUMENTS

| | | | |
|---|---|---|---|
| 2011/0034175 A1 | 2/2011 | Fong et al. | |
| 2012/0057535 A1* | 3/2012 | Zhang | H04W 72/0426 370/329 |
| 2012/0147773 A1 | 6/2012 | Kim et al. | |
| 2013/0077581 A1* | 3/2013 | Lee | H04L 25/0204 370/329 |
| 2013/0288731 A1* | 10/2013 | Chu | H04B 7/024 455/509 |
| 2013/0343317 A1* | 12/2013 | Etemad | H04B 7/024 370/329 |

FOREIGN PATENT DOCUMENTS

| | | |
|---|---|---|
| WO | WO 2011/020062 A2 | 2/2011 |
| WO | 10-2012-0089254 A | 8/2012 |

\* cited by examiner

FIG. 5
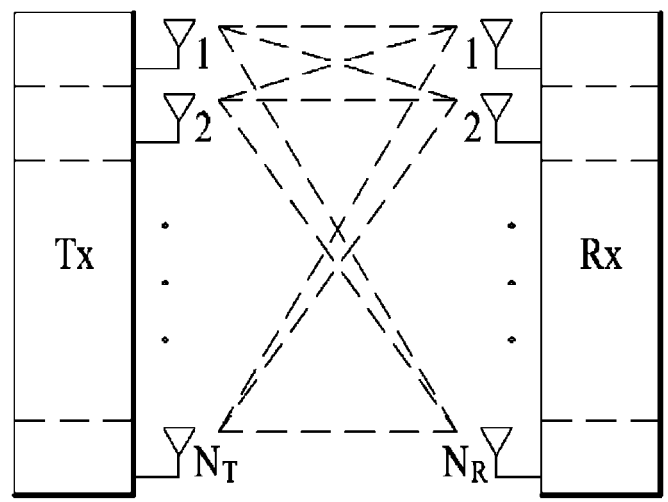
(a)
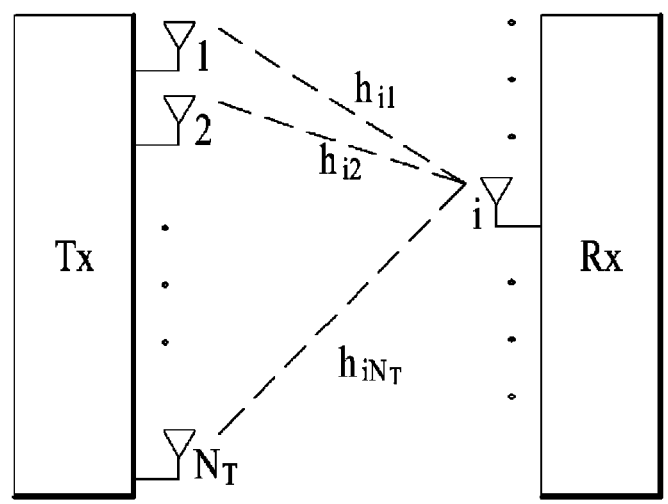
(b)

FIG. 6
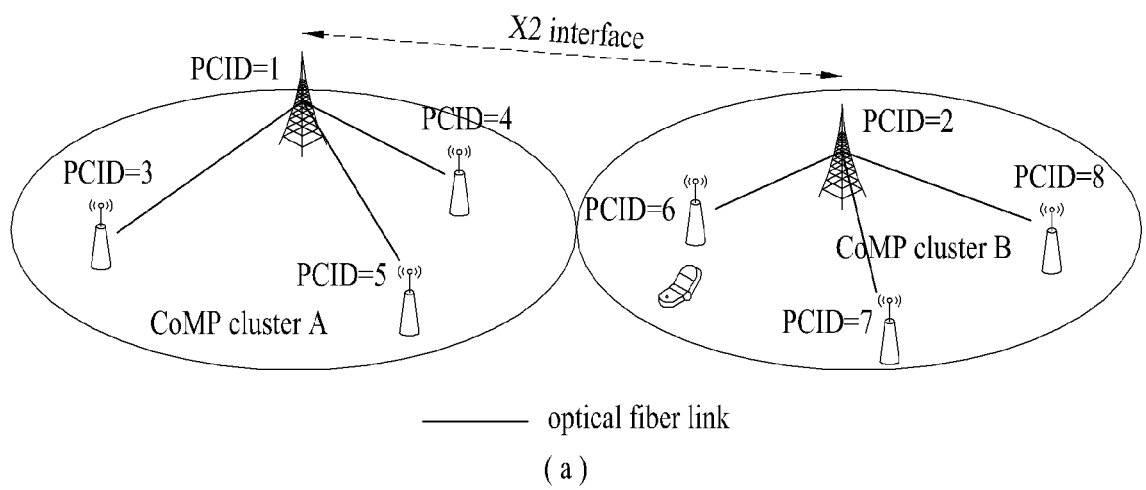
(a)
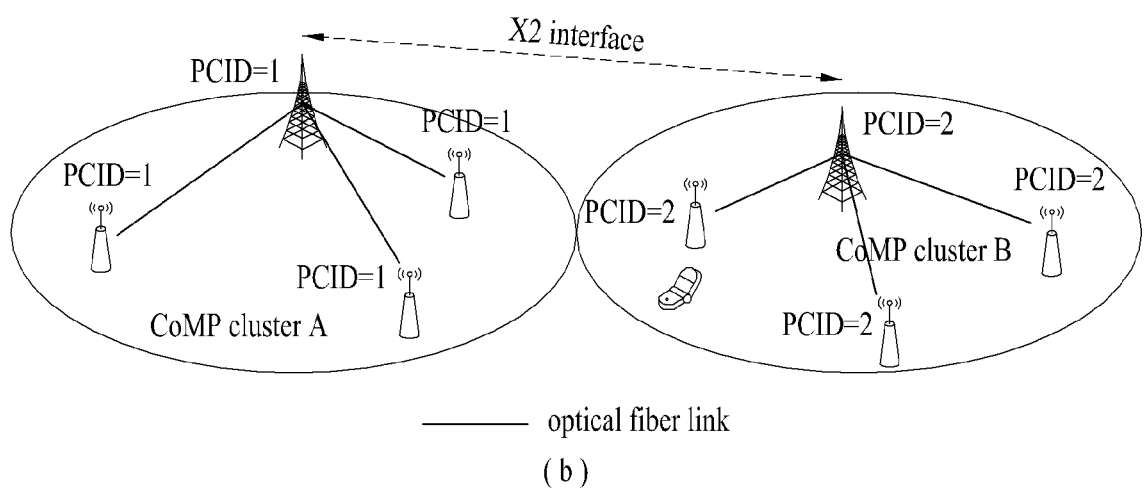
(b)

METHOD FOR SUPPORTING COMP IN WIRELESS COMMUNICATION SYSTEM AND DEVICE THEREFOR

CROSS REFERENCE TO RELATED APPLICATIONS

This application is the National Phase of PCT International Application No. PCT/KR2013/006675, filed on Jul. 25, 2013, which claims priority under 35 U.S.C. 119(e) to U.S. Provisional Application No. 61/706,787, filed on Sep. 28, 2012, all of which are hereby expressly incorporated by reference into the present application.

TECHNICAL FIELD

The present invention relates to a wireless communication system, and more particularly, to a method for supporting CoMP (Coordinated Multiple-Point transmission and reception) in a wireless communication system and a device therefor.

BACKGROUND ART

Recently, since various devices requiring machine-to-machine (M2M) communication and high data transfer rate, such as smartphones or tablet personal computers (PCs), have appeared and come into widespread use. This rapidly increases the quantity of data which needs to be processed in a cellular network. In order to satisfy the rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been spotlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has data throughput much higher than that of the legacy communication scheme in which each node operates as an independent base station (BS) to communicate with the UE without cooperation.

A multi-node system performs coordinated communication using a plurality of nodes, each of which operates as a base station or an access point, an antenna, an antenna group, a radio remote header (RRH), and a radio remote unit (RRU). Unlike the conventional centralized antenna system in which antennas are concentrated on a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by transmitting/receiving different data streams simultaneously. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to result in a decrease in pathloss and to enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communications with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently determining a coordinated multiple-point transmission and reception (CoMP) set in a wireless communication system.

Another object of the present invention is to provide a method for determining a CoMP set through X2 interface.

The technical objects that can be achieved through the present invention are not limited to what has been particularly described hereinabove and other technical objects not described herein will be more clearly understood by persons skilled in the art from the following detailed description.

Technical Solution

According to one embodiment of the present invention, a method for enabling a coordinated multiple-point transmission and reception (CoMP) scheduling device to determine a CoMP set in a wireless communication system, which supports CoMP, comprises receiving, from at least one base station, information on a terminal served by the base station; determining a CoMP set based on the received information on the terminal; and transmitting identification information of the terminal(s) included in the CoMP set to a base station(s) included in the CoMP set, wherein the information on the terminal includes at least one of the identification information of the terminal, capability, quality of service (QoS), a channel state value between the terminal and each base station neighboring to the terminal, and/or ePDCCH (enhanced Physical Downlink Control CHannel) set configuration information of the terminal.

Preferably, the transmitting may include transmitting a period for the CoMP, which is allocated to each of the terminal (s).

Preferably, the period may indicate a continuous or discontinuous subframe pattern.

Preferably, the transmitting may include transmitting information on a hybrid automatic retransmission request (HARQ) process of each of the terminal (s), which is allocated to each of the base station(s) included in the CoMP set.

Preferably, the method may further comprise receiving load information of the base station from the at least one base station, wherein the load information may include at least one of the number of terminal (s) connected to the base station and the amount of data traffic of the connected terminal (s).

According to another embodiment of the present invention, a method for enabling a base station to determine a coordinated multiple-point transmission and reception (CoMP) set in a wireless communication system, which supports CoMP, comprises transmitting information on a terminal served by the base station to a CoMP scheduling device; and receiving identification information of terminal (s) included in the CoMP set determined based on the information on the terminal, wherein the information on the terminal includes at least one of the identification information of the terminal, capability, quality of service (QoS), a channel state value between the terminal and each base station neighboring to the terminal, and/or ePDCCH (enhanced Physical Downlink Control CHannel) set configuration information of the terminal.

Preferably, the receiving may include receiving information on a period allocated to each of the terminal(s) for the CoMP.

Preferably, the information on the period may include a continuous or discontinuous subframe pattern indicating the period.

Preferably, the receiving may include receiving information on a hybrid automatic retransmission request (HARQ) process of each of the terminal(s), which is allocated to the base station.

Preferably, the method may further comprise transmitting load information of the base station to the CoMP scheduling device, wherein the load information may include at least one of the number of terminal(s) connected to the base station and the amount of data traffic of the connected terminal(s).

Preferably, the method may further comprise transmitting uplink or downlink related scheduling information for each terminal included in the CoMP set, on the ePDCCH.

Preferably, if the scheduling information is transmitted on a part of an ePDCCH set of the terminal, the method may further comprise transmitting information on the ePDCCH set, on which the scheduling information is transmitted, to the terminal.

According to still another embodiment of the present invention, a coordinated multiple-point transmission and reception (CoMP) scheduling device configured to determine a CoMP set in a wireless communication system, which supports CoMP, comprises a transmission and reception unit; and a processor configured to control the transmission and reception unit, wherein the processor is configured to receive, from at least one base station, information on a terminal served by the base station, determine a CoMP set based on the received information on the terminal and transmit identification information of the terminal(s) included in the CoMP set to a base station(s) included in the CoMP set, and the information on the terminal includes at least one of the identification information of the terminal, capability, quality of service (QoS), a channel state value between the terminal and each base station neighboring to the terminal, and/or ePDCCH (enhanced Physical Downlink Control CHannel) set configuration information of the terminal.

According to further still another embodiment of the present invention, a base station configured to determine a coordinated multiple-point transmission and reception (CoMP) set in a wireless communication system, which supports CoMP, comprises a transmission and reception unit; and a processor configured to control the transmission and reception unit, wherein the processor is configured to transmit information on a terminal served by the base station to a CoMP scheduling device and receive identification information of terminal(s) included in the CoMP set determined based on the information on the terminal, and the information on the terminal includes at least one of the identification information of the terminal, capability, quality of service (QoS), a channel state value between the terminal and each base station neighboring to the terminal, and/or ePDCCH (enhanced Physical Downlink Control CHannel) set configuration information of the terminal.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a coordinated multiple-point transmission and reception (CoMP) set in a wireless communication system may be determined efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a block diagram illustrating MIMO (Multi-Input Multi-Output) used in a 3GPP LTE/LTE-A system;

FIG. 6 is a diagram illustrating a wireless communication system according to the embodiment(s) of the present invention;

BEST MODE FOR CARRYING OUT THE INVENTION

Figure 1:
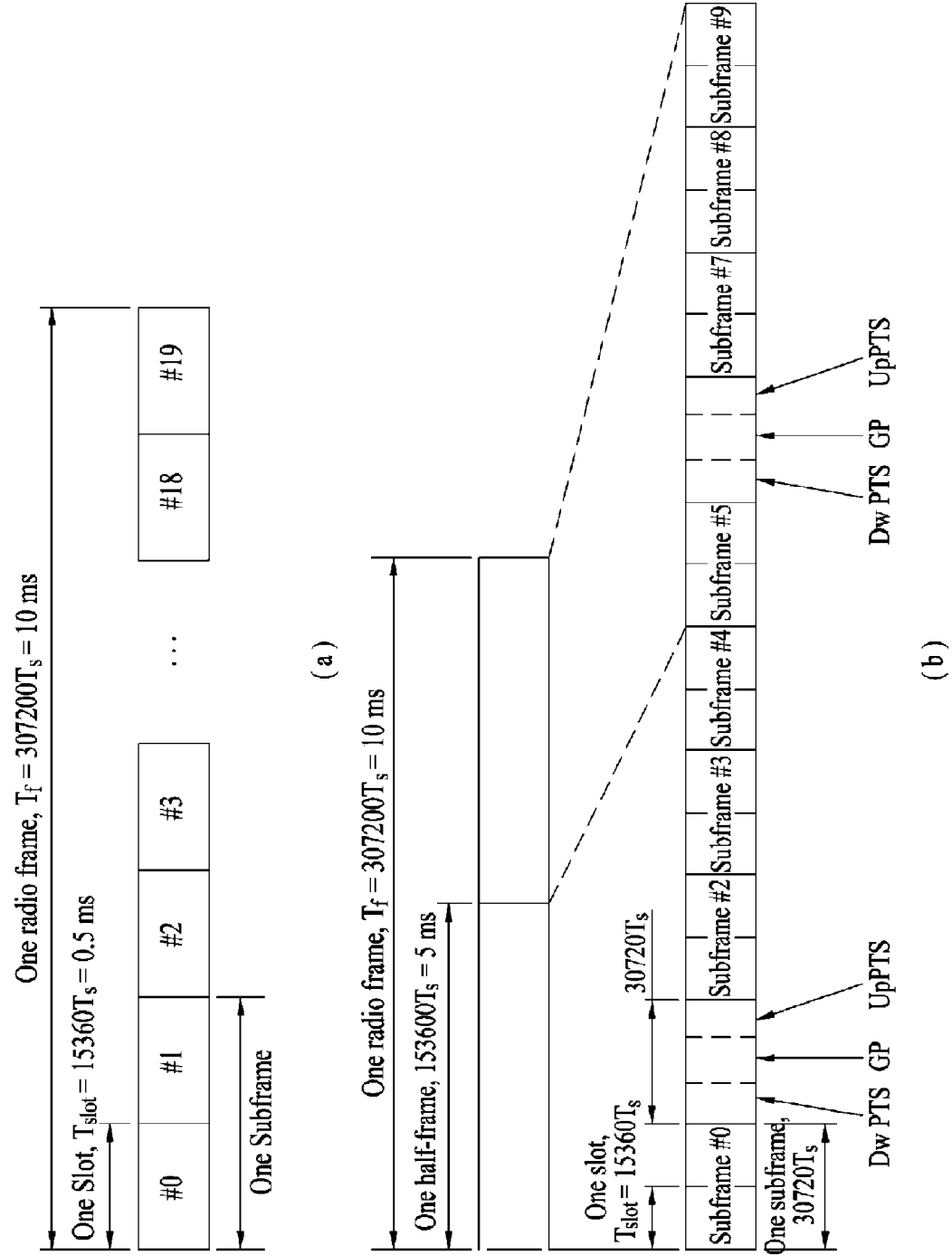
FIG. 1 is a diagram illustrating an example of a structure of a radio frame used in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device. In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). In the following description, the term BS for use in the present invention will hereinafter be referred to as eNB.

In embodiments of the present invention, a node is a fixed point that communicates with a UE to transmit or receive a radio frequency (RF) signal to or from the UE. Various eNBs may be used as a node irrespective of names thereof. For example, a BS, NB, eNB, pico-cell eNB (PeNB), home eNB (HeNB), relay, or repeater may be used as a node. Also, a BS may not be used as a node as necessary. For example, a radio remote head (RRH) or radio remote unit (RRU) may be used as a node. RRH or RRU may have a lower power level than the eNB. RRH and/or RRU (hereinafter referred to as RRH/RRU) may be generally connected to the eNB through a dedicated line such as an optical cable, such that coordinated communication of RRH/RRU or eNB can be performed more smoothly than coordinated communication of eNBs interconnected through a radio link. At least one antenna is installed at a node. The antenna may be a physical antenna. Alternatively, the antenna may be an antenna port, virtual antenna, or an antenna group. The node may be referred to as a point. In a conventional centralized antenna system (CAS) (that is, single node system), antennas are centralized in a BS or eNB such that the antennas are controlled by a single eNB controller. In a multi-node system, on the other hand, a plurality of nodes is generally disposed at predetermined intervals. The nodes may be managed by one or more eNB or eNB controllers that control operations of the respective nodes or schedule data to be transmitted or received through the respective nodes. Each node may be connected to an eNB or eNB controller that controls the corresponding node via a cable or dedicated line. In the multi-node system, the same cell identifier (ID) or different cell IDs may be used to transmit or receive a signal to or from a plurality of nodes. In a case in which a plurality of nodes has the same cell ID in the multi-node system, each node serves as a group of some antennas of one cell. In a case in which a plurality of nodes has different cell IDs in the multi-node system, on the other hand, the multi-node system may be considered as a multi-cell (e.g., macro-cell, femto-cell, or pico-cell) system. When multiple cells respectively formed by the plurality of nodes are arranged in coverages in an overlaying manner, a network constructed by the multiple cells is called a multi-tier network. A cell ID of RRH/RRU may be identical to or different from that of the eNB. If the RRH/RRU and the eNB use different cell IDs, each of the RRH/RRU and the eNB operates as an independent BS or eNB.

In the multi-node system to be described in the following description, one or more eNBs or eNB controllers connected to a plurality of nodes can simultaneously transmit signals to UE(s) or simultaneously receive signals from the UE(s) through all or some of the plurality of nodes. While multi-node systems are distinguished according to the nature and implementation form of each node, the multi-node systems are different from single-node systems (e.g., CAS, conventional MIMO system, conventional relay system, conventional repeater system, etc.) since a plurality of nodes participates in a process of providing a communication service to UEs over a predetermined time-frequency resource. Accordingly, methods for performing coordinated transmission of data using all or some of a plurality of nodes according to embodiments of the present invention can be applied to various types of multi-node systems. Though a node generally refers to an antenna group spaced apart from other nodes by over a predetermined distance, the following embodiments of the present invention can be applied even when the node means an antenna group regardless of spacing. For instance, in the case of an eNB including cross polarized (X-pol) antennas, the embodiments of the present invention can be applied on the assumption that the eNB controls nodes configured with H-pol antennas and nodes configured with V-pol antennas.

A communication scheme for transmitting/receiving data through a plurality of transmission (Tx)/receiving (Rx) nodes, a communication scheme for transmitting/receiving signals through at least one node selected from among a plurality of Tx/Rx nodes, or a communication scheme for employing different nodes for transmission of DL and UL signals is referred to as multi-eNB MIMO or Coordinated multi-point Tx/Rx (COMP). Among these multi-point coordinated communications, coordinated transmission schemes can be largely classified into Joint Processing (JP) and scheduling coordination. The former can be classified into Joint Transmission (JT)/Joint Reception (JR) and Dynamic Cell Selection (DCS), and the latter can be classified into Coordinated Scheduling (CS) and Coordinated Beamforming (CB). DPS is also referred to as Dynamic Cell Selection (DCS). Compared to other coordinated communication schemes, when the JP scheme from among coordinated communication schemes between nodes is performed, many more communication environments can be formed. Among the JP schemes, JT refers to a communication scheme for enabling a plurality of nodes to transmit the same stream to a UE, and JR refers to a communication scheme for enabling a plurality of nodes to receive the same stream from a UE. The UE and the eNB may synthesize signals received from the plurality of nodes so as to recover the stream using the synthesized result. In case of JT/JR, since the same stream is transmitted to or received from the plurality of nodes, signal transmission reliability can be improved by 1 transmission diversity. DPS from among the JP schemes refers to a communication scheme in which signals are transmitted and received through one node selected from among a plurality of nodes according to a specific rule. In case of DPS, a good-channel-status node selected from among nodes will be generally selected as a communication node for communication with the UE, such that signal transmission reliability can be improved.

On the other hand, the term "Cell" refers to a predetermined geographical region in which one or more nodes can provide a communication service. Therefore, "communication with a specific cell" in the present invention may refer to communication with an eNB or node that provides a communication service to the specific cell. In addition, DL/UL signals of the specific cell may refer to DL/UL signals from the eNB or node that provides a communication service to the specific cell. A cell for providing a UL/DL communication service to the UE is referred to as a serving cell. A channel state/quality of a specific cell may refer to a channel state/quality of a communication link or a channel formed between the eNB (or node) providing a communication service to the specific cell and the UE. In the 3GPP LTE-A system, the UE may measure a DL channel state from the specific node using CSI-RS(s) transmitted on CSI-RS resources allocated to the specific node by antenna port(s) of the specific node. Generally, contiguous nodes may transmit the corresponding CSI-RS resources through orthogonal CSI-RS resources. Orthogonality of CSI-RS resources indicates that at least one of a CSI-RS resource configuration specifying symbols and subcarriers carrying a CSI-RS, a subframe configuration specifying subframes to which CSI-RS is allocated according to a subframe offset and a transmission period, and a CSI-RS sequence is different from each other.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/
PRACH resource. Therefore, in the present invention, PUCCH/PUSCH/PRACH transmission of a UE may be conceptuallay identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

FIG. 1 exemplarily shows a radio frame structure for use in a wireless communication system. In more detail, FIG. 1(a) shows a frequency division duplexing (FDD) frame structure for use in the 3GPP LTE/LTE-A system, and FIG. 1(b) shows a time division duplexing (TDD) frame structure for use in the 3GPP LTE/LTE-A system.

Referring to FIG. 1, a 3GPP LTE/LTE-A radio frame is 10 ms ($307,200T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. $T_s$ represents a sampling time and is given as $T_s=1/(2048\times15$ kHz$)$. Each subframe is further divided into two slots, each 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a specific frequency domain. On the other hand, in the TDD mode, DL transmission and UL transmission are discriminated according to time, such that a radio frame includes both a DL subframe and a UL subframe in a specific frequency domain.

Table 1 shows an exemplary DL-UL construction in a TDD mode.

TABLE 1

| DL-UL config- uration | Downlink- to-Uplink Switch-point periodicity | Subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D denotes a DL subframe, U denotes a UL subframe, and S denotes a special subframe. Specifically, the special subframe S includes three fields, i.e., a Downlink Pilot TimeSlot (DwPTS) field, a Guard Period (GP) field, and an Uplink Pilot TimeSlot (UpPTS) field. DwPTS is a time interval reserved for DL transmission, and UpPTS is a time interval reserved for UL transmission. Table 2 shows a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
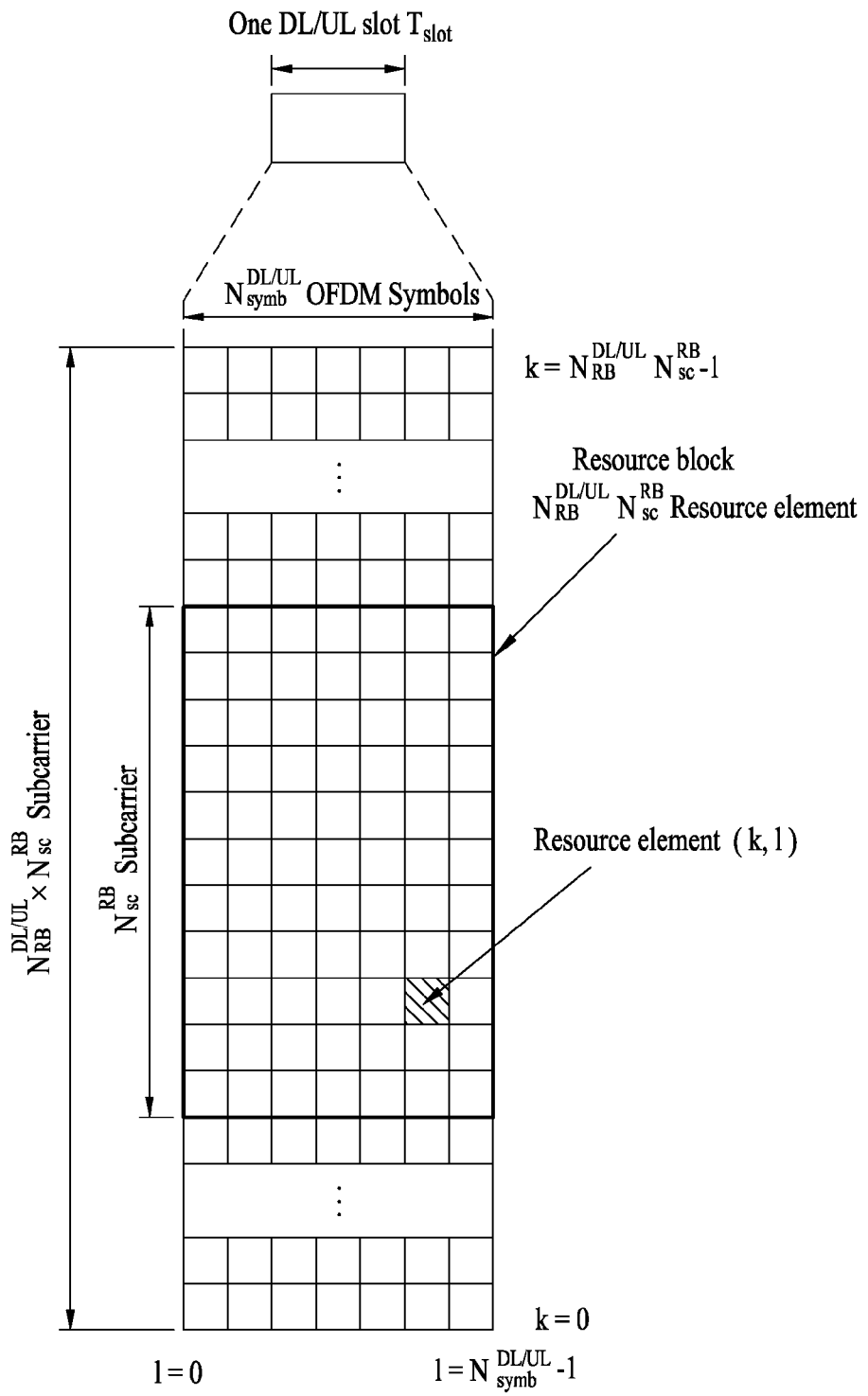
FIG. 2 is a diagram illustrating an example of a structure of a downlink (DL)/uplink (UL) slot in a wireless communication system.

FIG. 2 exemplarily shows a downlink/uplink (DL/UL) slot structure for use in a wireless communication system. In more detail, FIG. 2 shows a resource grid structure of the 3GPP LTE/LTE-A system. As can be seen from FIG. 2, a resource grid is assigned per antenna port.

Referring to FIG. 2, one slot may include a plurality of OFDM symbols in a time domain and include a plurality of Resource Blocks (RBs) in a frequency domain. The OFDM symbol may also indicate a single symbol interval. A transmission (Tx) signal for each slot may be denoted by a resource grid composed of $N_{RB}^{DL/UL} \times N_{sc}^{RB}$ subcarriers and $N_{symb}^{DL/UL}$ OFDM symbols. In this case, $N_{RB}^{DL}$ denotes the number of RBs included in the downlink slot. $N_{RB}^{UL}$ denotes the number of RBs included in the uplink slot. $N_{RB}^{DL}$ and $N_{RB}^{UL}$ are dependent upon a DL transmission bandwidth and a UL transmission bandwidth, respectively. $N_{symb}^{DL}$ is the number of OFDM symbols contained in the DL slot, and $N_{symb}^{UL}$ is the number of OFDM symbols contained in the UL slot. $N_{sc}^{RB}$ is the number of subcarriers contained in one RB.

OFDM symbols may be referred to as OFDM symbols or SC-FDM symbols according to a multiple access method. The number of OFDM symbols included in one slot may be variously changed depending upon a channel bandwidth and the length of a Cylic Prefix (CP). For example, in case of a normal CP, one slot includes 7 OFDM symbols. In case of an extended CP, on the other hand, one slot includes 6 OFDM symbols. In FIG. 2, a subframe having 7 OFDM symbols for each slot is shown for convenience of description. However, the embodiments of the present invention may be applied to subframes having a different number of OFDM symbols in the same manner. Referring to FIG. 2, each OFDM symbol includes $N_{RB}^{DL/UL} \times N_{sc}^{RB}$ subcarriers in a frequency domain. Subcarriers may be classified into a data subcarrier for data transmission, a reference signal subcarrier for reference signal (RS) transmission, and a null subcarrier for a guard band and direct current (DC) component. The null subcarrier for the direct current (DC) component is an unused subcarrier. The null subcarrier for the direct current (DC) component is mapped into a carrier frequency ($f_0$) during an OFDM signal generation process or a frequency up-conversion process. The carrier frequency may also be referred to as a center frequency.

One RB is defined as contiguous $N_{symb}^{DL/UL}$ (for example, 7) OFDM symbols in a time domain and is also defined as contiguous $N_{sc}^{RB}$ (for example, 12) subcarriers in a frequency domain. For reference, a resource including one OFDM symbol and one subcarrier is referred to as a resource element (RE) or a tone. Consequently, one RB includes $N_{symb}^{DL/UL} \times N_{sc}^{RB}$ resource elements (REs). Each resource element (RE) contained in a resource grid may be uniquely defined by an index pair (k, l) in one slot. Where, k indicates indexes given from 0 to $N_{RB}^{DL/UL} \times N_{sc}^{RB} - 1$ in a frequency domain, and l indicates indexes given from 0 to $N_{symb}^{DL/UL} - 1$ in a time domain.

In one subframe, two RBs respectively located in two slots of the subframe while occupying contiguous $N_{sc}^{RB}$ same subcarriers are referred to as a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
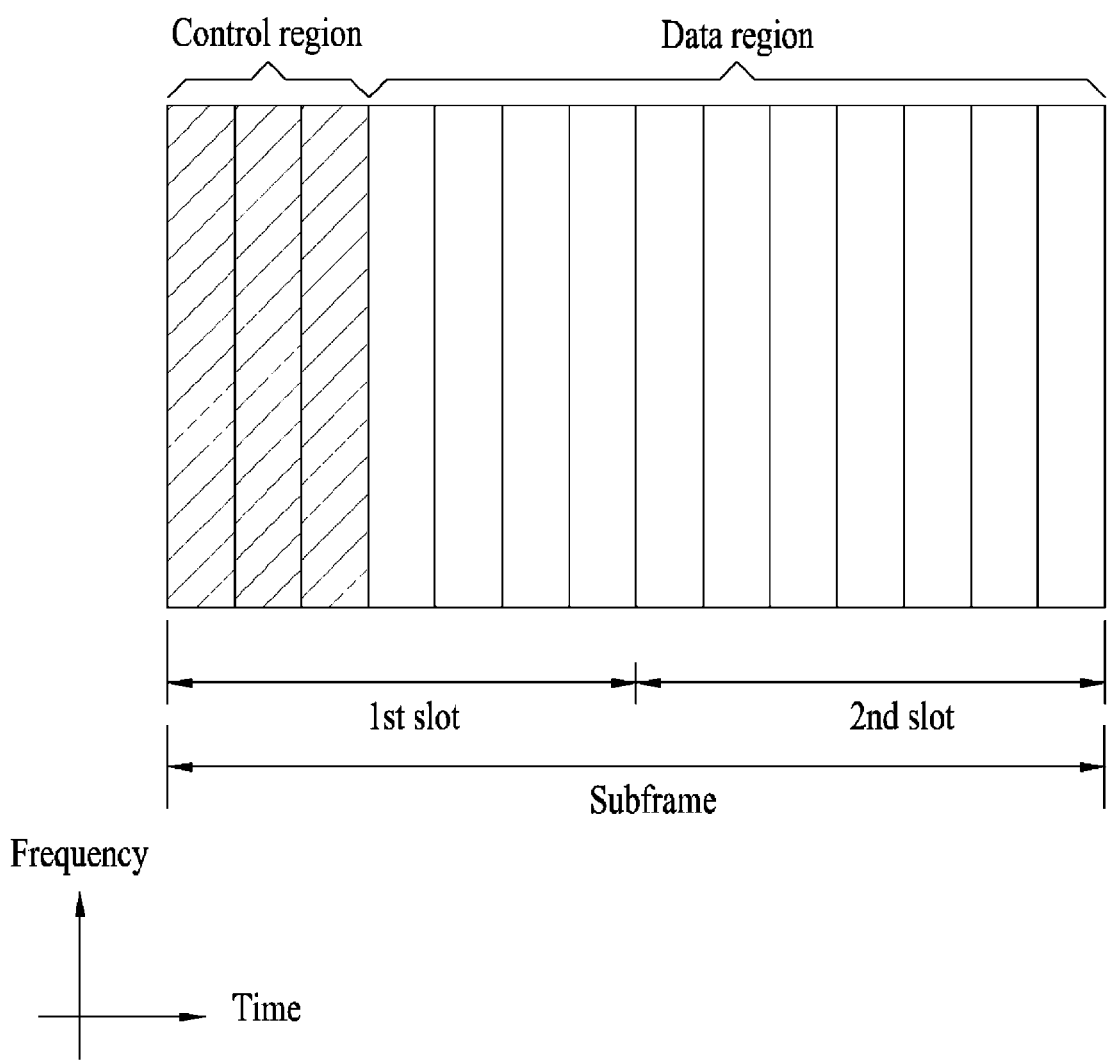
FIG. 3 is a diagram illustrating a structure of a DL subframe used in a 3GPP LTE/LTE-A system.

FIG. 3 is a view showing an example of a DL subframe structure used in a 3GPP LTE/LTE-A system.

Referring to FIG. 3, a DL subframe may be divided into a control region and a data region in a time domain. Referring to FIG. 3, maximum three (or four) front OFDM symbols in a first slot of the subframe correspond to the control region to which a control channel is assigned. Hereinafter, a resource region of the DL subframe available for PDCCH transmission will be referred to as a PDCCH region. The remaining OFDM symbols other than OFDM symbol(s) used as a control region correspond to the data region to which a Physical Downlink Shared Channel (PDSCH) is assigned. Hereinafter, a resource region of the DL subframe available for PDSCH transmission will be referred to as a PDSCH region. Examples of DL control channels used in 3GPP LTE include a Physical Control Format Indicator Channel (PCFICH), Physical Downlink Control Channel (PDCCH), and Physical hybrid ARQ indicator Channel (PHICH). PCFICH carries information regarding the number of OFDM symbols transmitted from the first OFDM symbol of a subframe and used to transmit a control channel in the subframe. PHICH carries a Hybrid Automatic Repeat Request acknowledgment/negative-acknowledgment (HARQ ACK/NACK) signal in response to UL transmission.

Control information transmitted through PDCCH is referred to as Downlink Control Information (DCI). DCI includes resource assignment information for a UE or UE group and other Control Information. For example, DCI includes transmission format and resource assignment information of a downlink shared channel (DL-SCH), transmission format and resource assignment information of an uplink shared channel (UL-SCH), paging information on a paging channel (PCH), system information on DL-SCH, resource assignment information of an upper layer control message, such as arbitrary connection response, transmitted on PDSCH, a Transmit Control Command Set regarding individual UEs in a UE group, a Transmit Power Control (TPC) command, Voice over IP (VoIP) activation indication information, and a Downlink Assignment Index (DAI). Transmission format and resource assignment information of a downlink shared channel (DL-SCH) is also referred to as DL scheduling information or DL grant, and transmission format and resource assignment information of an uplink shared channel (UL-SCH) is also referred to as UL scheduling information or UL grant. DCI carried by one PDCCH may have different sizes and usages according to a DCI format. If necessary, the DCI size may also be changed according to a coding rate. A variety of DCI formats are defined in the 3GPP LTE system, for example, formats 0 and 4 for uplink, and formats 1, 1A, 1B, 1C, 1D, 2, 2A, 2B, 2C, 3, 3A, etc. for downlink. DCI format may selectively include a variety of control information according to various usages, such that the selected control information is transmitted as DL control information to the UE. For example, DCI format may selectively include a hopping flag, RB allocation, modulation coding scheme (MCS), redundancy version (RV), new data indicator (NDI), transmit power control (TPC), cyclic shift demodulation reference signal (CS DM RS), channel quality information (CQI) request, HARQ process number, transmitted precoding matrix indicator (TPMI), precoding matrix indicator (PMI) confirmation, etc.

Generally, a DCI format capable of being transmitted to the UE may be changed according to a UE-configured transmission mode TM. In other words, for a UE configured in a specific transmission (Tx) mode, instead of all DCI formats, only some DCI format(s) corresponding to the specific Tx mode can be used.

PDCCH is transmitted on a control channel element (CCE) or an aggregate (or aggregation) of contiguous CCEs. CCE is a logical assignment unit used to provide a coding rate based on a wireless channel status to PDCCH. CCE corresponds to a plurality of resource element groups (REGs). For example, one CCE corresponds to nine REGs, and one REG corresponds to four REs. In case of the 3GPP LTE system, a CCE set in which PDCCH can be located for each UE is defined. A CCE set from which a UE can find its own PDCCH is referred to as a PDCCH search space or simply a search space (SS). An individual resource, to which PDCCH can be transmitted in the search space, is referred to as a PDCCH candidate. A set of PDCCH candidates to be monitored by a UE is defined as a search space. In a 3GPP LTE/LTE-A system, search spaces for respective DCI formats may have different sizes. A dedicated search space and a common search space are defined in the 3GPP LTE/LTE-A system. The dedicated search space is a UE-specific search space, and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to one, two, four, or eight CCEs according to a CCE aggregation level. The eNB or BS transmits real PDCCH (DCI) on an arbitrary PDCCH candidate in a search space, and UE monitors the search space to find the PDCCH (DCI). Monitoring means attempt to decode individual PDCCH in a corresponding search space according to all monitored DCI formats. A UE may monitor a plurality of PDCCHs to detect its own PDCCH. Because a UE does not basically know a position from which its own PDCCH is transmitted, the UE attempts to decode all PDCCHs of a corresponding DCI format every subframe until the UE detects a PDCCH having an identifier thereof. This procedure is referred to as blind decoding (BD).

The eNB or BS may transmit data for a UE or a UE group through a data region. Data transmitted through the data region may also be referred to as user data. To transmit user data, a Physical Downlink Shared CHannel (PDSCH) may be assigned to the data region. A Paging channel (PCH) and a Downlink-shared channel (DL-SCH) are transmitted through a PDSCH. A UE may decode control information transmitted through a PDCCH to read data transmitted through a PDSCH. Information regarding which UE or UE group is used as a transmission destination of PDSCH data, or information regarding how the UE or UE group receives and decodes PDSCH data is contained in PDCCH, so that the resultant PDCCH is transmitted. For example, it is assumed that a specific PDCCH is Cyclic redundancy check (CRC) masked with a Radio Network Temporary Identity (RNTI) of "A", and information regarding data transmitted using radio resources (for example, frequency position) of "B" and transmission format information (for example, transmission block size, modulation scheme, coding information, etc.) of "C" is transmitted through a specific DL subframe. A UE monitors PDCCH using its own RNTI information. A UE having an RNTI of "A" detects PDCCH, and receives PDSCH indicated by "B" and "C" through information of the received PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
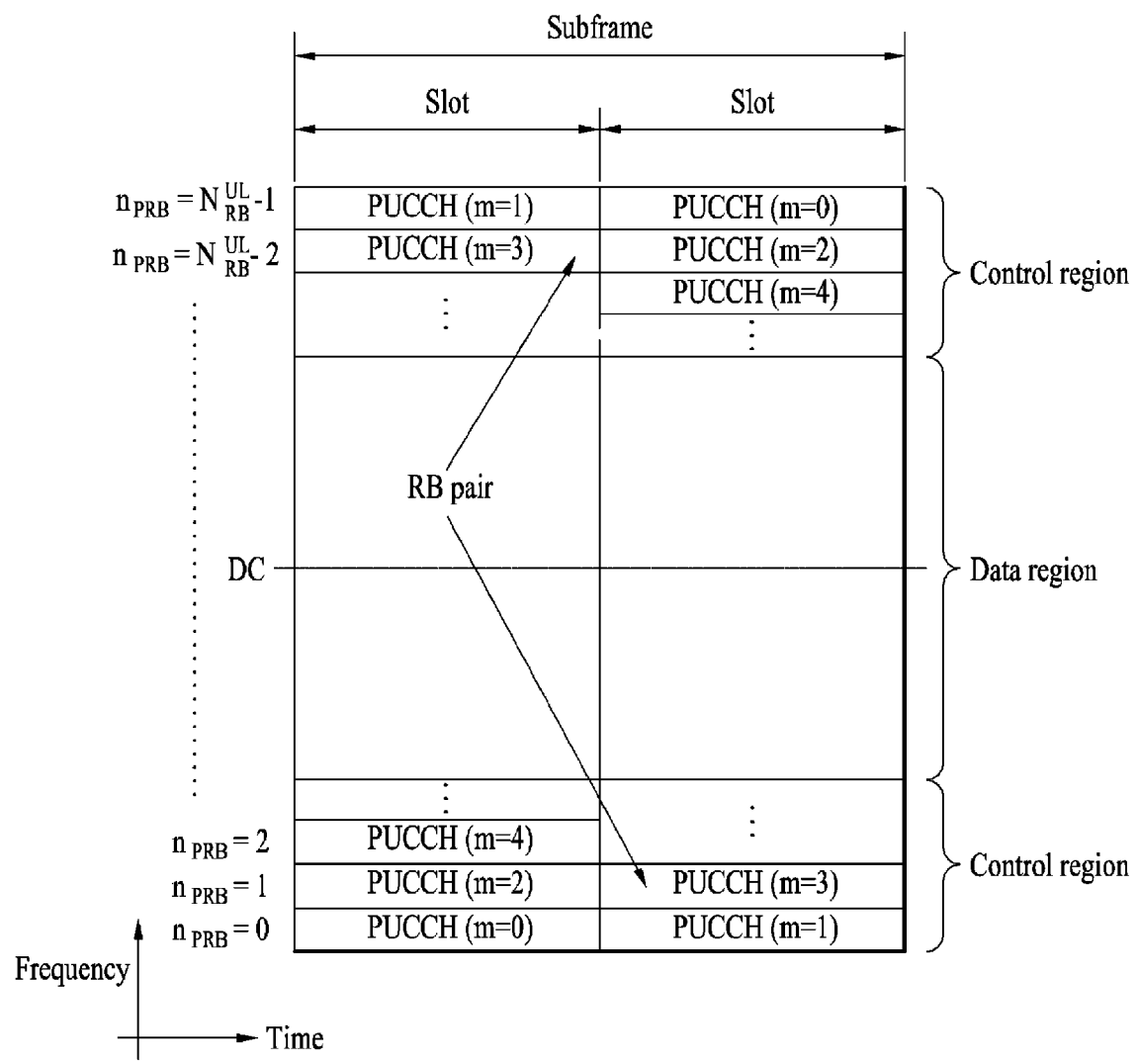
FIG. 4 is a diagram illustrating a UL subframe used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

FIG. 5 illustrates a configuration of a wireless communication system having multiple antennas.

As shown in FIG. 5(a), if the number of transmit antennas is increased to NT and the number of receive antennas is increased to NR, theoretical channel transmission capacity is increased in proportion to the number of antennas, unlike the case where a plurality of antennas is used in either a transmitter or a receiver. Accordingly, it is possible to improve transmission rate and to remarkably enhance frequency efficiency. As the channel transmission capacity is increased, the transmission rate may be theoretically increased by a product of a maximum transmission rate R0 upon using a single antenna and a rate increase ratio Ri.

$$R_i = \min(N_T, N_R) \quad \text{[Equation 1]}$$

For example, in a MIMO communication system using four transmit antennas and four receive antennas, a transmission rate which is four times that of a single antenna system may be theoretically obtained.

A communication method in the MIMO system is described in more detail using mathematical modeling. In the above system, it is assumed that NT transmit antennas and NR receive antennas are present.

In a transmission signal, if NT transmit antennas are present, a maximum number of pieces of transmission information is NT. The transmission information may be expressed as follows.

$$s = [s_1, s_2, \ldots, s_{N_T}]^T \quad \text{[Equation 2]}$$

Individual transmission information pieces $s_1, s_2, \ldots, s_{N_T}$ may have different transmit powers. If the respective transmit powers are denoted by $P_1, P_2, \ldots, P_{N_T}$, transmission information having adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, ŝ may be expressed using a diagonal matrix P of a transmit power as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

It is assumed that NT transmission signals $x_1, x_2, \ldots, x_{N_T}$ to be actually transmitted are configured by applying a weight matrix W to the transmit power adjusted information vector Ŝ. The weight matrix W serves to appropriately distribute transmission information to individual antennas according to a transport channel situation. $x_1, x_2, \ldots, x_{N_T}$ may be expressed using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

where, $W_{ij}$ denotes a weight between an i-th transmit antenna and a j-th information. W is also called a precoding matrix.

If NR receive antennas are present, respective reception signals $y_1, y_2, \ldots, y_{N_R}$ of the antennas may be expressed as follows.

$$y = [y_1, y_2, \ldots, y_{N_R}]^T \qquad \text{[Equation 6]}$$

In modeling channels of the MIMO wireless communication system, the channels may be distinguished from each other according to transmit/receive antenna indexes. A channel passing from a transmit antenna j to a receive antenna i is denoted as $h_{ij}$. In an index order of $h_{ij}$, it is noted that an index of a receive antenna precedes an index of a transmit antenna.

FIG. 5(b) illustrates channels passing from the NT transmit antennas to the receive antenna i. The channels may be expressed in the form of a combination of a vector and a matrix. In FIG. 5(b), the channels passing from the NT transmit antennas to the receive antenna i may be represented as follows.

$$h_i^T = [h_{i1}, h_{i2}, \ldots, h_{iN_T}] \qquad \text{[Equation 7]}$$

Accordingly, all channels passing from the NT transmit antennas to the NR receive antennas may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \qquad \text{[Equation 8]}$$

Additive White Gaussian Noise (AWGN) is added to actual channels passing through the channel matrix H. AWGN $n_1, n_2, \ldots, n_{N_R}$ added to the respective NR receive antennas may be expressed as follows.

$$n = [n_1, n_2, \ldots, n_{N_R}]^T \qquad \text{[Equation 9]}$$

According to the above-described mathematical modeling method, a reception signal may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the numbers of rows and columns of the channel matrix H indicating a channel state are determined by the number of transmit and receive antennas. The number of rows of the channel matrix H is equal to the number of receive antennas, NR, and the number of columns thereof is equal to the number of transmit antennas, NT. That is, the channel matrix H is an NR×NT matrix.

A matrix rank is defined by the smaller of the number of rows and the number of columns, where the rows and the columns are independent of each other. Accordingly, the matrix rank cannot be greater than the number of rows or columns. The rank of the channel matrix H, rank (H), is restricted as follows.

$$\text{rank}(H) \leq \min(N_T, N_R) \qquad \text{[Equation 11]}$$

Another definition of rank may be given as the number of non-zero Eigen values when a matrix is subjected to Eigen value decomposition. Similarly, rank may be defined as the number of non-zero singular values when a matrix is subjected to singular value decomposition. Accordingly, the physical meaning of rank in a channel matrix may be a maximum number of elements capable of transmitting different information via a given channel.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple receiving (Rx) points (RPs)) is referred to as UL CoMP, and the other case in which there are multiple DL points (i.e., multiple transmitting (Tx) points (TPs)) is referred to as DL CoMP.

HARQ Process

In the LTE FDD system, eight Stop-And-Wait (SAW) HARQ processes are supported on both the uplink and the downlink in accordance with a constant round-trip time (RTT) of 8 ms.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process). Also, in the LTE system, it is defined that information such as a new data indicator (NDI), a redundancy version (RV) and a modulation and coding scheme (MCS) level is signaled to the reception end.

In the meantime, the downlink HARQ process of the LTE system is an adaptive asynchronous scheme. Accordingly, downlink control information for the HARQ process is explicitly accompanied per downlink transmission. On the other hand, the uplink HARQ process of the LTE system is a synchronous scheme, and may be performed adaptively or non-adaptively. Since the uplink non-adaptive HARQ scheme does not accompany signaling of explicit control information, sequence such as previously set RV sequence, that is, 0, 2, 3, 1, 0, 2, 3, 1, . . . is required for continuous packet transmission. However, according to the uplink adaptive HARQ scheme, RV is signaled explicitly.

Enhanced-PDCCH (EPDCCH)

The LTE system after release 11 considers an enhanced PDCCH (EPDCCH) that may be transmitted through a conventional PDSCH region, as a solution of PDCCH capacity shortage caused by Coordinate Multi Point (COMP), Multi User-Multiple Input Multiple Output (MU-MIMO), etc. and PDCCH throughput reduction caused by inter-cell interference. Also, unlike conventional CRS based PDCCH, DMRS based channel estimation may be performed for the EPDCCH to obtain precoding gain.

EPDCCH transmission may be divided into localized EPDCCH transmission and distributed EPDCCH transmission depending on configuration of PRB (Physical Resource Block) pair used for EPDCCH transmission. The localized EPDCCH transmission means that ECCEs used for one DCI transmission are adjacent to one another in a frequency domain, and specific precoding may be applied to the localized EPDCCH transmission to obtain beamforming gain. For example, the localized EPDCCH transmission may be based on continuous ECCEs corresponding to an aggregation level. On the other hand, the distributed EPDCCH transmission means that one EPDCCH is transmitted from PRB pair spaced apart from the frequency domain, and has gain in view of frequency diversity. For example, the distributed EPDCCH transmission may be based on ECCE comprised of four EREGs included in each PRB pair spaced apart from the frequency domain.

The user equipment may perform blind decoding similarly to the existing LTE/LTE-A system, to receive and acquire downlink control information (DCI) through the EPDCCH. In more detail, the user equipment may attempt (monitor) decoding for a set of EPDCCH candidates per aggregation level for DCI formats corresponding to a set transmission mode. In this case, the set of the EPDCCH candidates for monitoring may be referred to as EPDCCH UE-specific search space, which may be set/configured per aggregation level. Also, the aggregation level of {1, 2, 4, 8, 16, 32} may be configured in accordance with subframe type, CP length, available resource amount within the PRB pair, etc. differently from the existing LTE/LTE-A system.

The user equipment configured by the EPDCCH may index REs included in the PRB pair set to EREG and again index the EREG to ECCE unit. The user equipment may determine EPDCCH candidates, which constitute the search space, on the basis of the indexed ECCE and perform blind decoding, thereby receiving control information. In this case, the EREG is a concept corresponding to REG of the existing LTE/LTE-A system, and the ECCE is a concept corresponding to CCE. 16 EREGs may be included in one PRB pair.

In addition, for each serving cell, one UE may configure one or two EPDCCH PRB sets for PDCCH monitoring through higher layer signaling.

In 3GPP LTE Rel-11, a UE, to which a CoMP scheme is applied, may estimate channels of TPs, which may potentially participate in CoMP, using channel state information-reference signal (CSI-RS) resources defined as a CoMP measurement set and feed CSI such as a precoding matrix indicator (PMI), a channel quality indicator (CQI) or a rank indicator (RI) back to its serving cell on the basis of the estimated channel values. A network may configure a dynamic point selection (DPS) scheme for selecting a TP having relatively excellent channel quality based on the fed-back CSI information to enable the UE to perform data transmission, a coordinated scheduling/coordinated beamforming (CS/CB) scheme for, at TPs participating in CoMP, controlling scheduling and beamforming to reduce mutual interference and a joint transmission (JT) scheme for, at TPs participating in CoMP, transmitting the same data to the UE.

If the TPs perform CoMP operation through a non-ideal backhaul, a real-time CoMP structure is not operated due to backhaul delay unlike the existing ideal backhaul, whereby this specification suggests a network structure and a CoMP structure, which are suitable for the non-ideal backhaul.

Hereinafter, a CoMP cluster will be described. A CoMP cluster is a set of cells that are capable of performing the CoMP operations, i.e., cooperative scheduling and cooperative data transmission/reception, in accordance with mutual cooperation. For example, cells of a single cluster may be assigned with different physical cell IDs (PCIDs) as shown in FIG. 6(*a*), or cells of a single cluster may share the same PCIDs such that the cells may be configured in the form of a distributed antenna or RRH of a single eNB as shown in FIG. 6(*b*). In modified examples of FIG. 6, some cells from among cells of the single cluster may share the same PCIDs.

Generally, cells of the same CoMP cluster are interconnected through a backhaul link, such as an optical fiber having high capacity and low latency, so as to implement cooperative scheduling and cooperative data transmission/reception, such that the cooperative scheduling is possible, and are maintained at a correct time synchronization state, resulting in implementation of cooperative data transmission. In addition, when receiving signals from cells of the CoMP cluster participating in the cooperative data transmission, the size of CoMP cluster must be determined in a manner that a reception time difference between signals transmitted from respective cells may enter the scope of a cyclic prefix (CP) length of OFDM symbol on the basis of a propagation delay difference between respective cells. In contrast, cells belonging to different clusters may be interconnected through a lower-capacity backhaul link, and may not maintain time synchronization.

A UE configured to perform CoMP may perform cooperative scheduling and cooperative data transmission/reception by some or all of cells contained in the CoMP cluster, and the UE may measure a reference signal that is transmitted from some or all cells of the CoMP cluster in accordance with a UE reception signal quality. In order to measure link performances of UE and each cell, the UE may measure a reference signal of each cell and may report reception signal quality of the measured reference signal. Specifically, cells to be measured by the UE may be defined as a CoMP measurement set.

However, this specification is intended to suggest a scenario for performing CoMP between TPs interconnected through a non-ideal backhaul that may cause delay between the TPs.

Figure 7:
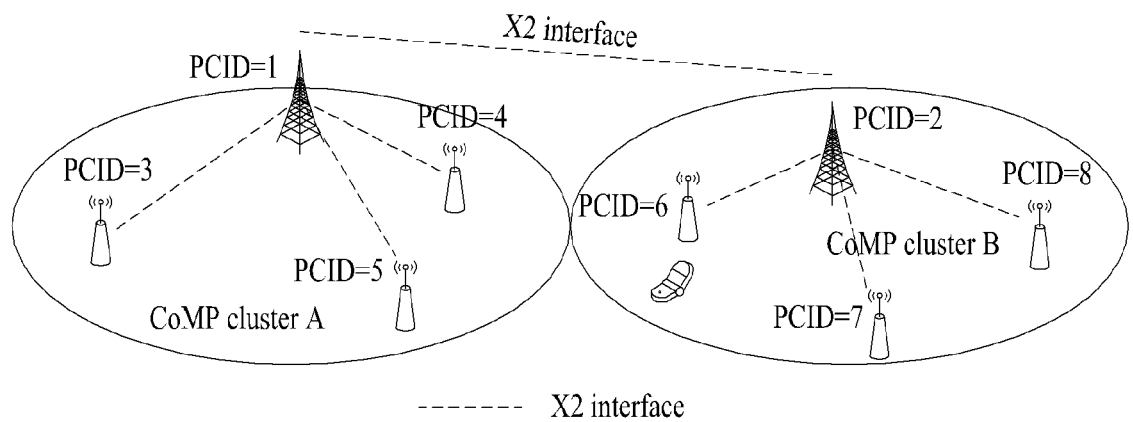
FIG. 7 is a diagram illustrating a wireless communication system according to the embodiment(s) of the present invention.

FIG. 7 illustrates a scenario that TPs in a CoMP cluster are interconnected through X2 interface. There are a higher TP for controlling each TP and representative TPs (TP of PCID=1 in CoMP cluster A, and TP of PCID=1 in CoMP cluster B) having a function of a scheduler, etc. in a CoMP cluster A and a CoMP cluster B, wherein the representative TPs and each TP may perform communication through the X2 interface. The respective representative TPs may perform mutual communication through the X2 interface. It is assumed that the respective TPs are interconnected through the X2 interface although not shown in the accompanying drawing of this specification.

Figure 8:
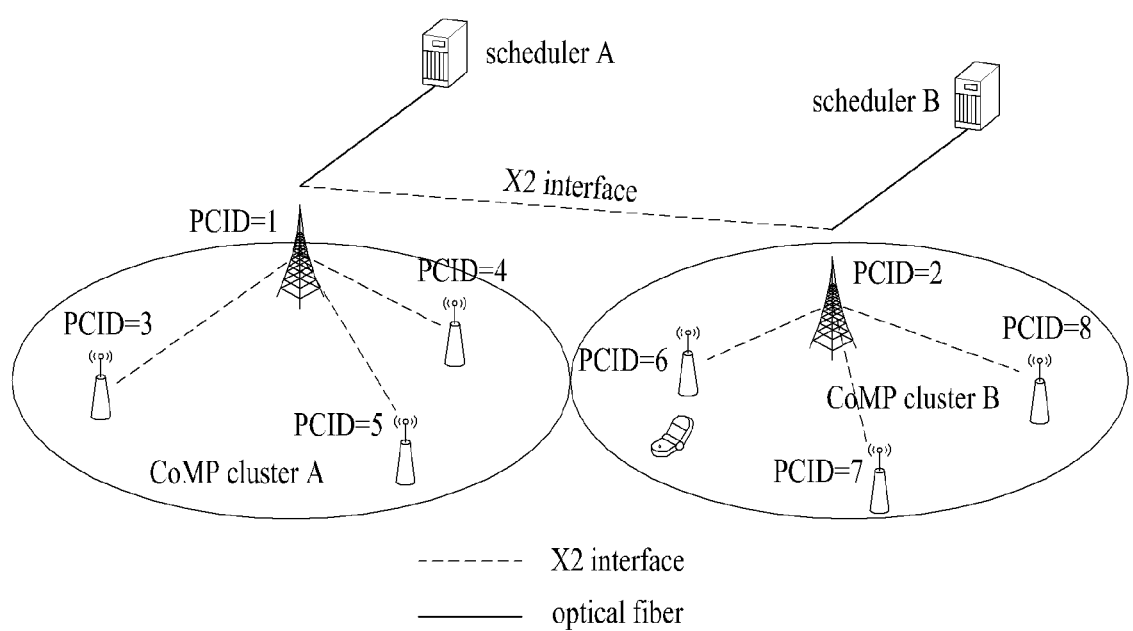
FIG. 8 is a diagram illustrating a wireless communication system according to the embodiment(s) of the present invention.

On the other hand, entities, i.e., schedulers A and B, which have a function of controlling and scheduling lower TPs, may exist in the representative TP separately from the base station as shown in FIG. 8. In FIG. 8, the scheduler A serves to control and schedule the TPs and UEs, which belong to the CoMP cluster A, and the scheduler B serves to control and schedule the TPs and UEs, which belong to the CoMP cluster B. Information for each TP is transferred to the TPs having PCID 1 and PCID 2, which correspond to the representative TPs, through the X2 interface, and processing and scheduling of every information are determined by the scheduler connected with the representative TP.

Figure 9:
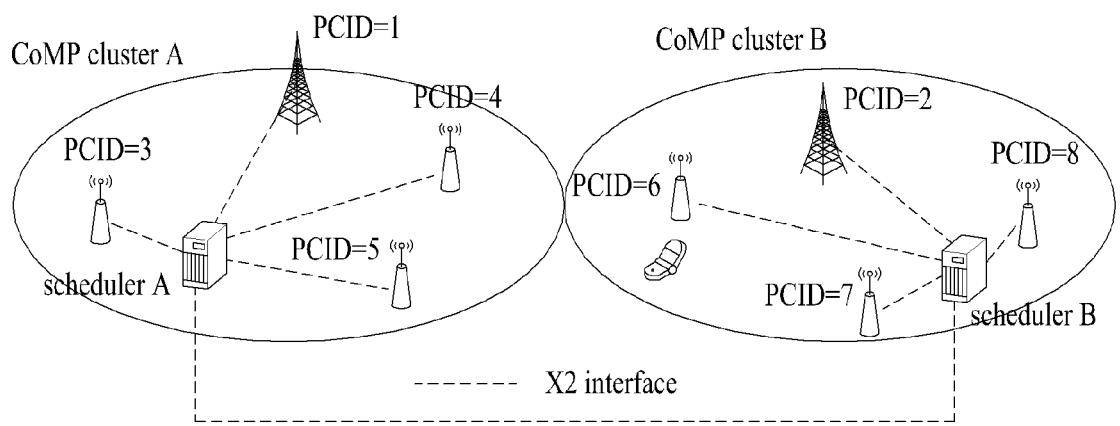
FIG. 9 is a diagram illustrating a wireless communication system according to the embodiment(s) of the present invention.

Another network structure that performs CoMP operation through a non-ideal backhaul is shown in FIG. 9. Information to be transmitted/received from each TP without a concept of a representative TP is collected to the scheduler that serves to control each CoMP cluster, and the scheduler serves to transfer a control, scheduling and important command of each TP by using the received information. The schedulers of the respective CoMP clusters may also be interconnected through the X2 interface. As another embodiment, for data intensive processing, the schedulers of the respective CoMP clusters may be interconnected through a real-time transmission medium such as an optical fiber.

Figure 10:
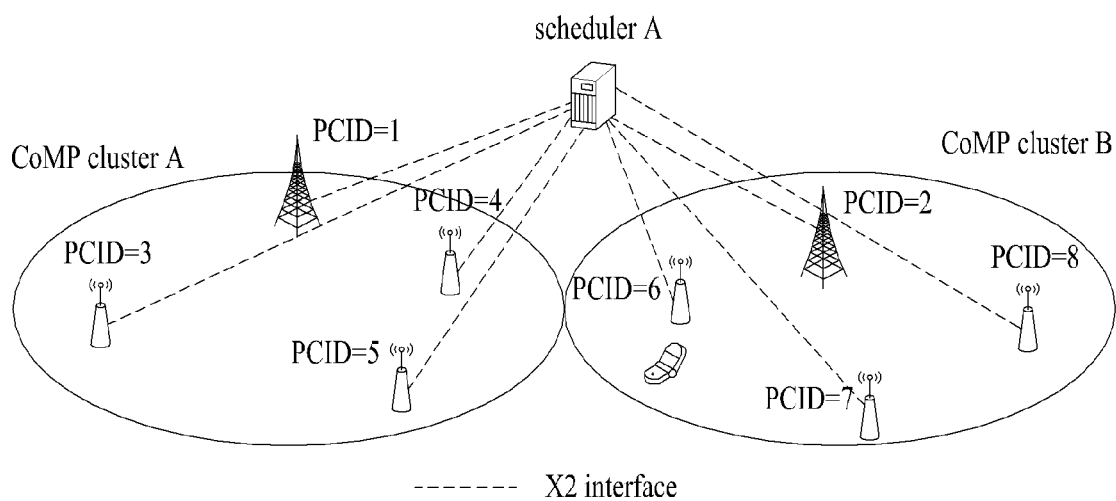
FIG. 10 is a diagram illustrating a wireless communication system according to the embodiment(s) of the present invention.

As still another embodiment, one scheduler may perform a function of scheduling and controlling a plurality of CoMP clusters as shown in FIG. 10.

How the representative TP or the scheduler controls and schedules each TP will be described based on the aforementioned network structure described with reference to the accompanying drawings. In more detail, how the representative TP or the scheduler enables DL CoMP operation will be suggested. For convenience of description, the representative TP and the scheduler will now be referred to as a "scheduler".

First Embodiment

The present invention suggests a method for enabling a scheduler to efficiently support DL CoMP operation as a higher entity of a TP or eNB. The scheduler may be referred to as another terminology such as a scheduling device, a CoMP scheduling device, a control device, and a control station.

The scheduler should receive information on a UE, which takes TPs as a serving cell, from each TP, and each TP should report any change in the information on the UE to the scheduler whenever there is any change in the information on the UE. The information on the UE may include the following information:

Information on the UE;
 UE ID, capability of UE corresponding to each UE ID, QoS of each UE ID;
 a long-term channel measurement report value from each TP participating in CoMP; and
  For example, RSRP (Reference Signal Received Power), RSRQ (Reference Signal Received Quality),
 CSI-RS based RSRP,
 CSI-RS and IMR based long-term SINR value of each CSI-process,
 a long-term channel measurement report value (For determination of CoMP cluster) from neighboring TP which does not participate in CoMP,
  For example, RSRP/RSRQ measurement report of neighboring cell.

Figure 11:
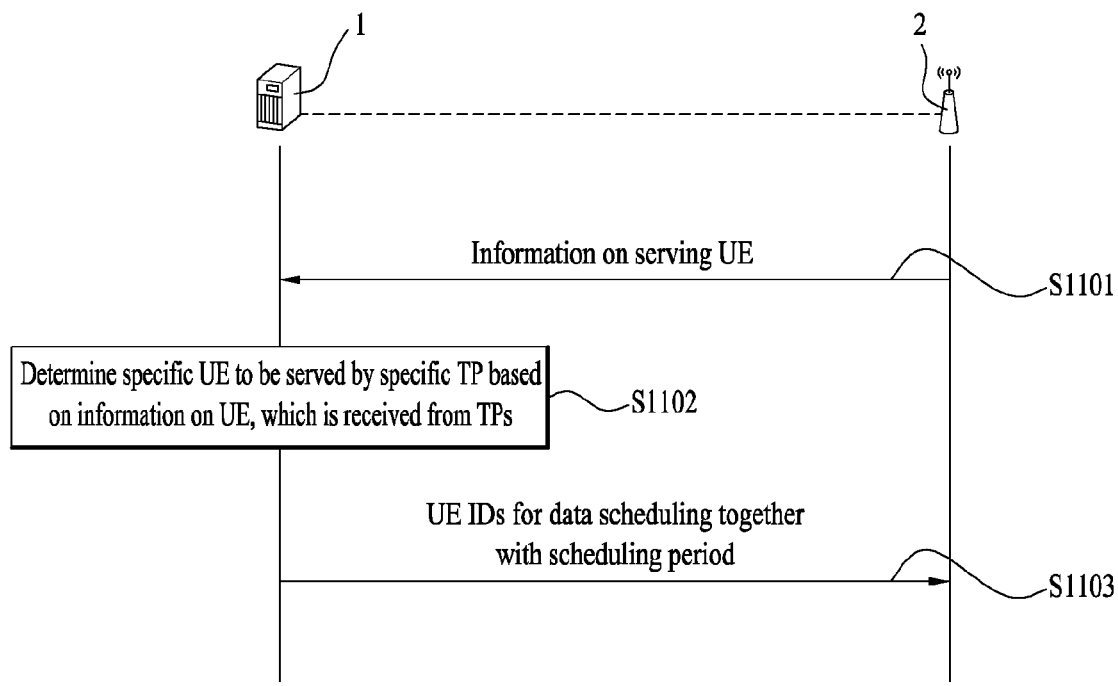
FIG. 11 is a diagram illustrating an operation according to the embodiment(s) of the present invention.

The scheduler may determine TPs and UEs that will be served by the TPs, on the basis of the information on the UE, which is received from each TP, and long-term and short-term CSI information on each UE, and may transfer the information on the determined UEs to the determined TPs. Also, the scheduler transfers information as to how long a specific TP serves to schedule a specific UE, that is, information on a scheduling time period, to the specific TP. An example of a procedure of enabling the scheduler to allocate UE served by each TP for a certain time period is shown in FIG. 11. Meanwhile, the scheduler may be one TP (that is, base station or eNB) in the CoMP cluster.

First of all, a TP 2 may transmit information on the UE, which takes the TP 2 as a serving cell, to the scheduler 1 (S1101). The scheduler may receive the information on the UE from several TPs, and the scheduler may determine a UE that should be served by each TP through CoMP operation, on the basis of the information on the UE, which is received from each TP (S1102). That is, in this step, UEs (hereinafter, referred to as CoMP UEs) participating in the CoMP operation and TPs (hereinafter, referred to as CoMP TPs) participating in the CoMP operation may be determined. Then, the scheduler may transmit ID(s) of the CoMP UE(s) to the CoMP TPs (S1103). As described above, since the information on the UE includes a long-term channel measurement report value of each TP, which is measured by each UE, the determination at the step S1102 may be based on the long-term channel measurement value.

The scheduler may transmit information as to how long scheduling period is required to perform the CoMP operation, that is, information on a scheduling period, to the corresponding TPs together with the ID(s) of the CoMP UE(s). The information on the scheduling period may indicate how long time the corresponding CoMP UEs should be served from a corresponding time. In more detail, the information on the scheduling period may specify a subframe or radio frame from a specific system frame number (SFN), or a specific time (for example, 20 ms). The information on the scheduling period may be varied depending on ID of each CoMP UE. To this end, the SFN should be aligned between the TP and the scheduler, and synchronization should be maintained within a certain time interval.

Second Embodiment

As another embodiment of the present invention, when allocating UEs to TPs, the scheduler may allocate some of HARQ processes of each UE to each TP without using information on a specific scheduling period.

In the LTE(-A) FDD system, one UE may generally have maximum 8 HARQ processes, wherein some of all HARQ processes allocated to each UE may be allocated to each TP participating in CoMP operation.

If a specific HARQ process of a specific UE is allocated to each TP, the TP may allocate uplink or downlink scheduling information (for example, UL grant or DL grant) related to a specific HARQ process number, and may transmit and receive downlink/uplink data of the specific UE on a time-frequency resource indicated by the scheduling information. Also, if retransmission of the downlink/uplink data of the specific UE is required, retransmission may be performed through the HARQ process allocated to the specific UE.

As an example of a method for allocating a UE as above, if a specific UE A is served by a TP A and a TP B in mutual cooperation, HARQ process numbers 0, 1, 2 and 3 of the UE A may be allocated to the TP A, and HARQ process numbers 4, 5, 6 and 7 of the UE A may be allocated to the TP B.

In a scheduling scheme based on the HARQ process, a scheduling time of the specific UE as well as the information on the HARQ process numbers may be indicated for each TP through a continuous time or discontinuous subframe pattern of the aforementioned scheduling period. In case of the subframe pattern, the subframe pattern capable of scheduling for the specific UE, that is, the scheduling pattern may be signaled to each TP through a bitmap. Also, a validity time tag indicating how long time scheduling allocation is valid may be transmitted by being included in the subframe pattern.

Third Embodiment

When a plurality of TPs perform X2 based CoMP, control information related to a corresponding UE should be shared between cooperative TPs through X2 interface. As a method for exchanging control information related to UE between TPs through X2 interface, one TP may signal control information of its serving UEs to other TPs proactively and periodically, and whenever the control information is updated, may signal the entire control information or updated some information to other TPs. As another method, the control information related to the corresponding UE may be signaled to a specific TP only if there is exchange of scheduling information on a specific UE to a specific TP.

Particularly, if the scheduler schedules the specific UE to the specific TP, a corresponding serving cell may transmit control information related to UEs served by itself to the scheduler on the basis of the event (that is, occurrence of scheduling). At this time, the control information related to the UE, which should be exchanged through the X2 interface, may include ePDCCH set configuration information of the corresponding UE, UL CSI report configuration/scheduling request configuration, transmission mode, zero power (ZP) and non-zero power (NZP) CSI-RS configuration, UL transmission parameter, etc. in addition to the "information on the UE" described in the first embodiment. The UL transmission parameter refers to configuration of PUCCH/PUSCH/CQI report/SR of a specific UE, and relates to time/frequency location, transmission period and transmission repetition number of times of signals transmitted from the UE to the uplink. Also, these kinds of information may be transferred from the serving cell to the scheduler, and the control information on the CoMP UE may be transferred to the CoMP TPs determined to serve the CoMP UE. As a result, the corresponding CoMP TP may serve the corresponding CoMP UE without reconfiguration.

In this specification, the serving cell refers to a specific cell that a UE acquires system information by attempting initial access through a random access channel (RACH) and decoding a physical broadcast channel (PBCH) or acquires system information through a method (for example, a method for acquiring system information of a specific cell from another cell) corresponding to initial access and decoding. In other words, the serving cell refers to a cell that a UE continues to receive and monitor system information to receive a service, and may be defined as a cell to which the UE has transmitted its basic UE identification information most recently.

Fourth Embodiment

In the legacy LTE system, a cell-specific reference signal (CRS) is transmitted per subframe, and a UE may perform synchronization/tracking and channel estimation/data demodulation by using the CRS. The CRS is transmitted by being scrambled as physical cell ID, and its transmission location on a time-frequency resource is also determined by physical cell ID. As described above, control information on PDSCH scheduling is transmitted through a control channel, and the control channel is generally divided into a CRS based PDCCFI and UE-specific RS (for example, demodulation reference signal; DMRS) based ePDCCH.

In order to support X2 based CoMP, scheduling of the UE is preferably performed in such a manner that the control information is transferred through the UE-specific RS based ePDCCH.

The UE should discover its control information by blind-decoding a configured ePDCCH region in configuring a plurality of ePDCCH configuration sets through higher layer signaling and receiving the control channel. In view of the base station, a plurality of base stations may transmit the control information by reserving their respective unique ePDCCH region. In view of the UE, the UE acquires control channel information on a region corresponding to the plurality of ePDCCH configuration sets by using its ID regardless of a base station that transmits the control channel information. Therefore, UE-transparent operation for an ePDCCH transmission entity may be supported such that the UE cannot know or does not need to know a base station that transmits the control information through the ePDCCEI. As a result, X2 based CoMP may be supported efficiently.

For example, if the TP A transmits control information by using an ePDCCH set 1 and the TP B transmits control information by using an ePDCCH set 2, and if the TP A and the TP B perform X2 based DL CoMP, the ePDCCH set 1 and the ePDCCH set 2 may be notified to the UE so that the UE may perform blind decoding at the ePDCCH sets 1 and 2 to receive the control information. As a result, the UE may receive PDSCH and corresponding control information from another TP not its serving cell at a specific time without separate signaling by blind-decoding the plurality of ePDCCHs, regardless of information on a TP that actually transmits a PDSCH to the UE at a specific subframe.

If the scheduler commands each TP to serve a specific UE for a certain time, since monitoring of the UE for the plurality of ePDCCH configuration sets increases unnecessary blind decoding number of times and increases power consumption of the UE, the serving cell may transmit information on a specific ePDCCH set to the UE through higher layer signaling if necessary to allow the UE not to monitor the corresponding ePDCCH set for a certain time. By contrast, the serving cell may activate the corresponding ePDCCH set to allow the UE to monitor the specific ePDCCH set for a certain time. In more detail, the serving cell may notify the UE of a plurality of ePDCCH sets to be monitored by the UE and activate/deactivate the specific ePDCCH set in accordance with TP(s) selection of the scheduler, thereby reducing unnecessary blind decoding number of times of the UE.

Fifth Embodiment

In order to increase CoMP gain and perform optimized UE allocation to each TP, load information per cell (per TP) should be exchanged between each TP and the scheduler, wherein the load information may include the number of connected (or activated) UEs, or the amount of data traffic. In this aspect, the centralized scheduler serves to control load between the TPs. A scheduling period and a scheduling pattern may be controlled based on the load information. If load of a specific TP is small, for more UE scheduling to the specific TP, the scheduling time of the specific TP, the number of subframes, or the number of HARQ processes may be increased.

Sixth Embodiment

As another embodiment of the present invention, the aforementioned operation may be performed through information exchange between TPs without a separate scheduler in a CoMP cluster. That is, information exchange required between the scheduler and each TP in the aforementioned embodiment(s) may be performed between the TPs, whereby the TPs may determine UE allocation and scheduling period or scheduling pattern autonomically. The information on the UE and scheduling related information, which should be exchanged between the TPs, are the same as those of the aforementioned embodiment(s). That is, in this embodiment, there are provided UE allocation information per TP and scheduling period or scheduling pattern per UE, and also the information on the UE should be exchanged. The information on the UE may include ePDCCH configuration set information of the corresponding UE, UL CSI report configuration/scheduling request configuration, transmission mode, zero power (ZP) and non-zero power (NZP) CSI-RS configuration, UL transmission parameters, etc. in addition to the "information on the UE" described in the example of the CoMP cluster where the scheduler exists.

Even in the case that there is no scheduler, load information per cell (per TP) should be exchanged between each TP and the scheduler to increase CoMP gain and perform optimized UE allocation to each TP, wherein the load information may include the number of connected (or activated) UEs, or the amount of data traffic. The scheduling period and the scheduling pattern may be controlled based on the load information. If load of a specific TP is small, for more UE scheduling to the specific TP, the scheduling time of the specific TP, the number of subframes, or the number of HARQ processes may be increased.

Seventh Embodiment

As another embodiment of the present invention, information similar to handover may be exchanged through X2 interface but this exchanged information may not be signaled to a UE. That is, although a network end performs handover of a specific UE to a specific cell, the network end does not transfer the handover to the UE, whereby a serving cell of the UE is not changed. The serving cell transfers information on a corresponding UE and control information for the corresponding UE to a specific TP through the X2 interface, and the specific TP that has received the information may transmit and receive data to and from the corresponding UE by using the information. Since the information is not transferred to the UE, the UE may receive DL data from a cell other than its serving cell without changing its serving cell. At this time, the UE cannot know a TP that transmits DL data, as far as there is no separate signaling.

This operation corresponds to the operation that a user plane (U-plane) is changed although a control plane (C-plane) is not changed, and may be understood as a restrictive handover operation.

Since the serving cell is not changed, basic control related operations, for example, serving cell/neighboring cell radio resource measurement (RRM) and radio link monitoring (RLM) should be performed based on the serving cell, and at the same time an operation related to a common search space (CSS) for demodulating a downlink control channel should be performed based on the serving cell. Since the UE cannot know a space of the control channel, from which control information for the UE is transmitted, during the operation for receiving and demodulating the downlink control channel, the control channel space to be searched by the UE may be divided into a CSS and a USS (user-specific search space). The CSS corresponds to system information/update and broadcast information, and is masked with SI-RNTI, and the USS corresponds to a space transmitted for a specific UE, and is masked with UE-RNTI of each UE. That the serving cell of the UE is not changed means that the USS of the UE may be changed but the CSS is not changed even though the TP for transmitting data is changed. Since the CSS is not changed and control information is transmitted from the corresponding space through SI-RNTI, whereby system related information and minimum information that is attached to a corresponding cell and may maintain service may be received from the serving cell, but other control information on data transmission may be identified through the USS transmitted from another TP.

Figure 12:
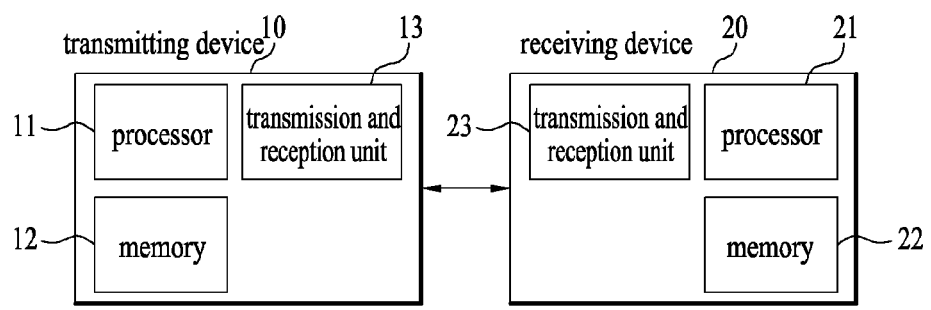
FIG. 12 is a block diagram illustrating a device for implementing the embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include transmission and reception units 13 and 23 for transmitting and receiving radio signals carrying information, data, signals, and/or messages, memories 12 and 22 for storing information related to communication in a wireless communication system, and processors 11 and 21 connected operationally to the transmission and reception units 13 and 23 and the memories 12 and 22 and configured to control the memories 12 and 22 and/or the transmission and reception units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmission and reception unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmission and reception unit 13 may include an oscillator. The transmission and reception unit 13 may include Nt (where Nt is a positive integer) transmit antennas.

A signal processing process of the receiving device 20 is the reverse of the signal processing process of the transmitting device 10. Under the control of the processor 21, the transmission and reception unit 23 of the receiving device 10 receives RF signals transmitted by the transmitting device 10. The transmission and reception unit 23 may include Nr receive antennas and frequency down-converts each signal received through receive antennas into a baseband signal. The transmission and reception unit 23 may include an oscillator for frequency down-conversion. The processor 21 decodes and demodulates the radio signals received through the receive antennas and restores data that the transmitting device 10 wishes to transmit.

The transmission and reception units 13 and 23 include one or more antennas. An antenna performs a function of transmitting signals processed by the transmission and reception units 13 and 23 to the exterior or receiving radio signals from the exterior to transfer the radio signals to the transmission and reception units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

In regard with an X2 interface, a scheduler, eNB and/or TP may function as a transmitting device or receiving device.

The transmission and reception units may be hardware and/or software which function as interfaces in connection with wired- or wireless communication.

The transmitting device and/or the receiving device may be configured as a combination of one or more embodiments of the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a terminal, a relay, a base station, etc.

The invention claimed is:
1. A method, by a coordinated multiple-point (CoMP) scheduling device connected with a plurality of base sta- tions, for determining a CoMP cluster in a wireless communication system supporting CoMP transmission and reception, the method comprising:
- receiving, from each of the plurality of base stations, information on a plurality of terminals served by the plurality of base stations;
- determining the CoMP cluster based on the received information on the plurality of terminals, wherein the CoMP cluster includes a set of base stations among the plurality of base stations; and
- transmitting, to the set of base stations included in the CoMP cluster, identification information of a set of terminals included in the CoMP cluster among the plurality of terminals,
- wherein the information on the plurality of terminals includes at least one of the identification information of the set of terminals, capability, quality of service (QoS), a channel state value between the plurality of terminals and each base station neighboring to the plurality of terminals, and enhanced Physical Downlink Control CHannel (ePDCCH) set configuration information of the plurality of terminals.

2. The method according to claim 1, wherein the transmitting includes transmitting a period for the CoMP, which is allocated to each of the plurality of terminals.

3. The method according to claim 2, wherein the period indicates a continuous or discontinuous subframe pattern.

4. The method according to claim 1, wherein the transmitting includes transmitting information on a hybrid automatic retransmission request (HARQ) process of each of the plurality of terminals, which is allocated to each of the set of base stations included in the CoMP cluster.

5. The method according to claim 1, further comprising receiving load information of the plurality of base stations from each of the plurality of base stations,
- wherein the load information includes at least one of a number of terminals connected to each of the plurality of base stations and an amount of data traffic of the connected terminals.

6. A method, by a base station among a plurality of base stations connected with a coordinated multiple-point (CoMP) scheduling device, for enabling the CoMP scheduling device to determine a CoMP cluster in a wireless communication system supporting CoMP transmission and reception, the method comprising:
- transmitting, to the CoMP scheduling device, information on at least one terminal served by the base station; and
- receiving, from the CoMP scheduling device, identification information of a set of terminals included in the CoMP cluster which is determined based on the information on the at least one terminal, wherein the CoMP cluster includes a set of base stations among the plurality of base stations,
- wherein the information on the at least one terminal includes at least one of the identification information of the set of terminals, capability, quality of service (QoS), a channel state value between the at least one terminal and each base station neighboring to the at least one terminal, and/or enhanced Physical Downlink Control CHannel (ePDCCH) set configuration information of the at least one terminal.

7. The method according to claim 6, wherein the receiving includes receiving information on a period for the CoMP allocated to each of the set of terminals included in the CoMP cluster.

8. The method according to claim 7, wherein the information on the period includes a continuous or discontinuous subframe pattern indicating the period.

9. The method according to claim 6, wherein the receiving includes receiving information on a hybrid automatic retransmission request (HARQ) process of each of the set of terminals included in the CoMP cluster.

10. The method according to claim 6, further comprising:
- transmitting, to the CoMP scheduling device, load information of the base station,
- wherein the load information includes at least one of a number of the at least one terminal served by the base station and an amount of data traffic of the at least one terminal served by the base station.

11. The method according to claim 6, further comprising transmitting uplink or downlink related scheduling information for each of the set of terminals included in the CoMP cluster, on the ePDCCH.

12. The method according to claim 11, if the scheduling information is transmitted on a part of an ePDCCH set of the at least one terminal, further comprising transmitting information on the ePDCCH set, on which the scheduling information is transmitted, to the at least one terminal.

13. A coordinated multiple-point (CoMP) scheduling device, which is connected with a plurality of base stations, configured to determine a CoMP cluster in a wireless communication system supporting CoMP transmission and reception, the CoMP scheduling device comprising:
- a transmission and reception unit; and
- a processor configured to control the transmission and reception unit,
- wherein the processor is configured to:
- receive, from each of the plurality of base stations, information on a plurality of terminals served by the plurality of base stations;
- determine the CoMP cluster based on the received information on the plurality of terminals, wherein the CoMP cluster includes a set of base stations among the plurality of base stations; and
- transmit, to the set of base stations included in the CoMP cluster, identification information of a set of terminals included in the CoMP cluster among the plurality of terminals,
- wherein the information on the plurality of terminals includes at least one of the identification information of the set of terminals, capability, quality of service (QoS), a channel state value between the plurality of terminals and each base station neighboring to the plurality of terminals, and enhanced Physical Downlink Control CHannel (ePDCCH) set configuration information of the plurality of terminals.

14. A base station, among a plurality of base stations connected with a coordinated multiple-point (CoMP) scheduling device, configured to enable the CoMP scheduling device to determine a CoMP cluster in a wireless communication system supporting CoMP transmission and reception, the base station comprising:
- a transmission and reception unit; and
- a processor configured to control the transmission and reception unit,
- wherein the processor is configured to:
- transmit, to the CoMP scheduling device, information on at least one terminal served by the base station; and
- receive, from the CoMP scheduling device, identification information of a set of terminals included in the CoMP cluster which is determined based on the information on the at least one terminal, wherein the CoMP cluster includes a set of base stations among the plurality of base stations,
wherein the information on the at least one terminal includes at least one of the identification information of the set of terminals, capability, quality of service (QoS), a channel state value between the at least one terminal and each base station neighboring to the at least one terminal, and/or enhanced Physical Downlink Control CHannel (ePDCCH) set configuration information of the at least one terminal.

* * * * *